United States Patent [19]

Lozachmeur

[11] Patent Number: 4,769,392
[45] Date of Patent: Sep. 6, 1988

[54] AQUEOUS SUSPENSION POLYMERIZATION PROCESS OF COMPOSITIONS CONTAINING STYRENE IN THE PRESENCE OF ROSIN ACID DERIVATIVES AND THEIR SALTS AND EXPANDABLE OR NON EXPANDABLE POLYSTYRENE OBTAINED

[75] Inventor: Didier Lozachmeur, Compiegne, France

[73] Assignee: Societe Chimique des Charbonnages Sa Tour Aurore, France

[21] Appl. No.: 97,180

[22] Filed: Sep. 16, 1987

[30] Foreign Application Priority Data

Sep. 17, 1986 [FR] France ................. 86 13006

[51] Int. Cl.$^4$ ............................. C08J 9/20
[52] U.S. Cl. ....................... 521/56; 521/60; 526/281; 526/282
[58] Field of Search ................... 521/56, 60

[56] References Cited

U.S. PATENT DOCUMENTS 3,526,605  9/1970  Ingram ................. 260/2.5

FOREIGN PATENT DOCUMENTS 1926480  1/1970  Fed. Rep. of Germany .
2071447  9/1971  France .
2265811  3/1974  France .

*Primary Examiner*—Morton Foelak
*Attorney, Agent, or Firm*—Finnegan, Henderson, Farabow, Garrett & Dunner

[57] ABSTRACT

The polymerization of compositions containing styrene by an aqueous suspension process in which is used a suspending agents system constituted by a mineral agent and, an extending agent which is at least a rosin acid derivative (abietic acid, neoabietic acid, dextropimaric acid) or their salts of a metal belonging to Group IIa of the Periodic Classification of elements. The use of this extending agent has the advantage to ameliorate the surface aspect of moulded articles obtained from expanded polymer pearls prepared with the above polymerization process.

5 Claims, No Drawings

AQUEOUS SUSPENSION POLYMERIZATION PROCESS OF COMPOSITIONS CONTAINING STYRENE IN THE PRESENCE OF ROSIN ACID DERIVATIVES AND THEIR SALTS AND EXPANDABLE OR NON EXPANDABLE POLYSTYRENE OBTAINED

The present application relates to an aqueous suspension polymerization process of compositions containing styrene in the presence of rosin acid derivatives and their salts and to expandable or not expandable styren obtained.

In the present application for the purpose of convenience compositions containing styrene will mean homopolymers derived from vinyl aromatic monomers including styrene, alpha-methyl-stryrene, isopropylstyrene, ethylvinylbenzene, vinyl toluene, vinyl xylene, chloro- and bromostyrene, as well as copolymers of the above vinylaromatic monomers with copolymerizable monomers such as, for example, acrylonitriles, alkyl acrylates or methacrylates in which the alkyl group contains 1 to 10 atoms wherein the monovinyl aromatic monomer is present in at least 50% by weight and/or a reticulating monomer such as divinylbenzene in low amount not exeeding 5% by weight.

Polymerization of styrene in aqueous suspension is well known. It is performed in the presence of a suspending agent system for styrene which can be either an organic solvent such as polyvinylic alcohol, hydroxyethylcellulose, polyvinylpyrirolidone or an inorganic suspending agent such as tricalcium phosphate, bentonite, talcum in combination with an extending agent. According to a generally aknowledged theory the inorganic agent acts as a barrier around the droplets of syren and avoids their coalescence. But the inorganic suspending agent is hydrophilic and tends to remain scattered in suspension water. The function of the extending agent is to attract inorganic agent particles around the droplets of styrene.

The applicant has found that rosin acid derivatives and their salts of Group IIa of the Periodic Classification act as extending agents.

A first object of the present application is a process for the polymerization of compositions containing styrene in which an aqueous suspension of styrene is prepared in the presence of a suspending agent system comprising a mineral agent and an extending agent, the suspension is polymerised and the particles obtained are separated, dried and classified caracterized in that the extending agent is at least a component selected in the group consisting of rosin acid derivatives and their salts of metals belonging to Group IIa of Periodic Classification of Elements.

The main rosin acid derivatives are abietic, neoabietic and dextropimaric acid having the following formula:

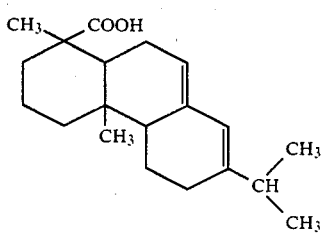

I

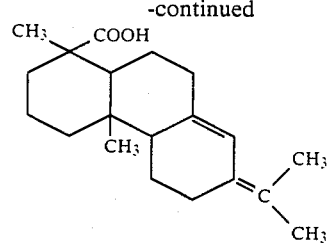

II

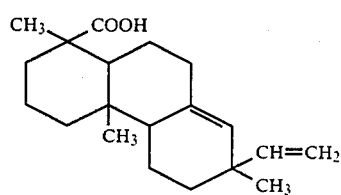

III and/or oligomers of these acids.

The following mixtures of rosin acid derivatives containing oligomers can be used.
monomers: about 70 to 80% by weight
dimers: about 10 to 30% by weight
trimers: about 1%

Mixtures of rosin acid derivatives, at least partially salified can also contain compounds resulting from bridging or association due do the fact that salts of metals of group IIa of Periodic Classification are divalent.

The salts of rosin acid derivatives are more particularly magnesium salts and even more particularly calcium salts.

The amount of extending agent added ranges between 1 and 5000 ppm, more particularly between 10 and 1000 ppm relative to styrene polymer. It must be noted that rosin acid derivatives and their salts have no extending action for quantity higher than 5000 ppm.

According to the present invention the extending agent is introduced before the end of polymerization. It can be introduced with the reactives, or during polymerization before the rate of polymerization exceeds 80%, preferably 50%. It can be added with inorganic suspending agent or after, in one or several successive doses.

Polymerization can be performed as already known, in the presence free radical initiators such as organic peroxides (benzoyl peroxide or t-butyl perbenzoate) or in the presence of azo bis isobutyronitrile.

It is known also to manufacture polystyren beads by an aqueous suspension polymerization process.

In that case a liquid or gaseous blowing agent is introduced into the reactive mixture during polymerization or at the end of polymerization.

The following blowing agents can be more particularly quoted: aliphatic hydrocarbons containing 1 to 10 carbon/atoms in the molecule, for example propane, butane, pentane, hexane, cyclohexane or their mixtures such as petroleum ether; and halogenated aliphatic hydrocarbons which boil at a temperature below the softening point of the polymer. The above blowing agents or their mixtures are introduced in the expandable polystyrene in amount ranging between 3 and 20% by weight relative to polystyrene.

The expandable polymer obtained is preexpanded in a opened or closed reactor by means of steam until it reaches the desired bulk density.

Conventionally expandable polystyrene particles are surface treated between polimerization and preexpansion with a stearate for example in order to avoid clogging and facilitate preexpansion. Then the preexpanded particles are fed into a mould (not gas tight) at a temperature lower than the boiling temperature of blowing agent until a low density article is obtained. Up to now the extending agent used led to expanded articles having a low cellularity. But there is a drawback: the moulded articles have a bad surface aspect. This is an inconvenient when the surface aspect is important as for example in offering package.

The applicant has also found that the addition of rosin acid derivatives or of their salts of metal of Group IIa of the Periodic Classification notably improved the surface aspect of moulded articles of expanded polystyrene.

It must be noted that then rosin acid derivatives and their salts act both as extending agent and aspec surface agent.

It seems that the good surface aspect is due to the presence at the surface of a great number of big splitted cells. Thus the brightaness of moulded articles is reduced and the defects of surface are masked to visual observation. Furthermore, it must be noted that cellularity in the heart of the article and near the surface are about the same.

The mean diameter of the particles obtained by aqueous suspension polymerization of styrene is generally ranging between 0.1 an 5 mm, preferably between 0.2 and 3 mm for expandable polystyrene.

The present invention has also for object thermoplastic compositions made out of expandable or not expandable polymers of compositions containing styren containing 1 to 5000 ppm, preferably 10 to 1000 ppm relative to the total weight of the composition of at least one substance selected in the group consisting of rosin acid derivatives and their salts of metals belonging to Group IIa of the Periodic Classification of Elements.

Polymeric compositions of the present invention may contain other additives such as flame retardants, fire proofing agents, organic or inorganic fillers, dyes proofing agents, organic or inorganic fillers, dyes, pigments, antistatic agents, plastifying agents.

The invention is further illustrated by the following examples.

EXAMPLE 1

(comparative)

To a stirred polymerization reactor having a capacity of 500l there was charged:
200 kg of demineralized water
200 kg of styrene
5.80 g of benzoyle peroxyde with 75% of active substance
200 g of tertiobutyl benzoate The mixture is stirred and the suspension obtained is heated up to 90° C. and the latter temperature is maintained for 1 hour.
440 g of tricalcium phosphate are added and the temperature is further maintained. Two hours and a half later there is no more suspension. Organic phase is decanted and no polymer pearls are formed.

EXAMPLE 2

The procedure of example 1 is repeated except at the 440 g of tricalcium phosphate are introduced in two amounts and that after 20 g, as a 20% solution in styren, of a mixture of rosin acid derivatives and of their calcium salts commercialized by DSM with trade mark URAPRINT 62126 are added.

5 hours later the reactor is automatically closed and 8% relative to polymer weight of pentane are added. The temperature is raised up to 130° C. and maintained at this temperature for one hour. The reactor is then cooled down to 30° C. The expandable polymer pearls are dried and classified to obtain a product ranging between 0.8 and 1.3 mm. The classified product is store for 5 days, and is preexpanded to a bulk density of about 20 g/l in a steam reactor. Then boxes are moulded and evaluated.

EXAMPLE 3

The procedure of example 2 is repeated except that 6 ppm relatives to the weight of reactor mixture of a solution of potassium sulfate at 10 g/l are added. The measured brightness, results of observation of cliche obtained by sweep microscopy (HEB) on a thin plate of polystyrene and visual observation are listed in the table given herebelow.

TABLE

| Expended polymer | Cellularity | |
|---|---|---|
| | at heart | near the surface |
| Example 2 | 250μ | 210μ |
| Example 3 | 140–190μ | 100μ |
| | brightness | visual observation |
| Example 2 | 7,7 | good surface aspect |
| Example 3 | 8,4 | bad surface aspect |

*the brightness was measured by reflectometry under an angle of incidence of 60° with a GARDNER reflectometer according to ASTM-D-523.

I claim:

1. Process for the polymerization of compositions containing styrene in which an aqueous suspension of styrene is prepared in the presence of suspending agent system comprising a mineral agent and an extending agent, the suspension is polymerized and the expandable particles obtained are separated, dried and classified characterized in that the extending agent is at least a compound selected in the group consisting of rosin acid derivatives and their salt belonging to Group IIa of the Periodic Classification of Elements.

2. Process for the polymerization of compositions containing styrene according to claim 1 in which the salts of rosin acid derivatives are magnesium salts.

3. Process for the polymerization to claim 1 in which the salts of rosin acid derivatives are calcium salts.

4. Process for the polymerization of compositions containing styrene according to anyone of claims 1 to 3 characterized in that the amount of rosin acid derivatives and of their salts belonging to Group IIa of the Periodic Classification of Elements ranges between 1 and 5000 ppm, preferably 10 and 1000 ppm of polymer of composition containing styrene.

5. Process for the polymerization of compositions of styrene according to anyone of claims 1 to 4 characterized in that the rosin acid derivatives and their salts are added before the end of polymerization before polymerization rate reaches 80%, preferably 50%.

* * * * *